United States Patent
Sugawara (10) Patent No.: US 7,852,516 B2
(45) Date of Patent: Dec. 14, 2010

(54) FACSIMILE MACHINE, AND CONTROL METHOD, PROGRAM, AND STORAGE MEDIUM THEREOF

(75) Inventor: Naoki Sugawara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1117 days.

(21) Appl. No.: 10/580,365

(22) PCT Filed: Dec. 2, 2004

(86) PCT No.: PCT/JP2004/048336

§ 371 (c)(1),
(2), (4) Date: May 23, 2006

(87) PCT Pub. No.: WO2005/055584

PCT Pub. Date: Jun. 16, 2005

(65) Prior Publication Data

US 2007/0146801 A1  Jun. 28, 2007

(30) Foreign Application Priority Data

Dec. 5, 2003  (JP) .............................. 2003-407977

(51) Int. Cl.
*H04N 1/00* (2006.01)
*H04N 1/04* (2006.01)

(52) U.S. Cl. ...................................... 358/400; 358/498

(58) Field of Classification Search ................ 358/1.13, 358/1.15, 400, 437, 468, 474, 497, 498; 710/48, 710/260–269; 399/361, 363; 271/256, 257; 718/103

See application file for complete search history.

(56) References Cited

U.S. PATENT DOCUMENTS 3,688,032 A * 8/1972 Dixon et al. ................ 358/497
5,570,205 A   10/1996 Sugita et al.

(Continued)

FOREIGN PATENT DOCUMENTS

CN   1166659 A   12/1997

(Continued)

OTHER PUBLICATIONS

European Search Report dated Feb. 28, 2007 issued in European application No. 04801633.1-1522.

(Continued)

*Primary Examiner*—Jerome Grant, II
(74) *Attorney, Agent, or Firm*—Fitzpatrick, Cella, Harper & Scinto (57) ABSTRACT

A facsimile machine a communication portion that receives first image data, and a recording part records that data on a recording sheet. A reading portion reads an original sheet and obtains second image data, which is transmitted by a second communication means. A medium conveying mechanism is used in reading an original sheet and in recording on a recording sheet. When the facsimile machine is instructed to read an original and transmit the read image while the communication portion receives image data, the reading portion reads the original and obtains the second image data while the communication portion receives the first image data, the recording part records the first image data on the recording sheet while the second communication means transmits the second image data, and the conveying mechanism automatically switches from conveying the original sheet to conveying the recording sheet.

10 Claims, 8 Drawing Sheets

U.S. PATENT DOCUMENTS

| | | | |
|---|---|---|---|
| H1677 H * | 9/1997 | Hu et al. | 358/468 |
| 5,663,804 A | 9/1997 | Kataoka et al. | |
| 5,717,506 A * | 2/1998 | Yamamoto et al. | 358/523 |
| 5,726,768 A * | 3/1998 | Ishikawa et al. | 358/442 |
| 5,901,276 A * | 5/1999 | Murahashi et al. | 358/1.13 |
| 6,262,805 B1 * | 7/2001 | Ishikawa et al. | 358/1.15 |
| 6,473,498 B1 * | 10/2002 | Foth | 379/93.09 |
| 6,741,366 B2 * | 5/2004 | Ishikawa et al. | 358/1.13 |
| 6,809,836 B1 | 10/2004 | Nobuta et al. | 358/1.9 |
| 7,187,466 B2 * | 3/2007 | Ishikawa et al. | 358/1.15 |
| 2007/0124421 A1 * | 5/2007 | Tashiro et al. | 709/217 |

FOREIGN PATENT DOCUMENTS

| | | |
|---|---|---|
| EP | 0 778 692 A2 | 6/1997 |
| JP | 4-138762 | 5/1992 |
| JP | 07283894 A * | 10/1995 |
| JP | 8-163288 | 6/1996 |
| JP | 09-163061 | 6/1997 |
| JP | 2899094 | 3/1999 |
| JP | 2-914168 A | 4/1999 |
| JP | 11-175293 | 7/1999 |
| JP | 11175293 A * | 7/1999 |

OTHER PUBLICATIONS

Notification of First Office Action dated Aug. 31, 2007 issued in Chinese counterpart application, application No. 200480035912.7 (and translation).

* cited by examiner

FACSIMILE MACHINE, AND CONTROL METHOD, PROGRAM, AND STORAGE MEDIUM THEREOF

TECHNICAL FIELD

The present invention relates to a facsimile machine, and a control method, a program and a storage medium thereof. The facsimile machine has an original conveying path in which an original is conveyed when performing a reading operation, and a recording conveying path in which a recording sheet is conveyed when performing a recording operation.

BACKGROUND ART

In general, in a conventional facsimile machine, an original conveying path in which an original is conveyed when performing a reading operation and a recording conveying path in which a recording sheet is conveyed when performing a recording operation have been completely separated (for example, see Patent Document 1).

Patent Document 1: Japanese Patent Application Laid-Open No. H08-163288

However, according to the above-described method, an edge sensor, a driving motor, and a conveying roller are required for each of reading and recording, respectively, and therefore, there is a problem that such a method is disadvantageous in terms of miniaturization and cost cutting of the facsimile machine.

Hence, it is considered that the edge sensor, the driving motor, and the conveying roller are commonly shared with reading and recording.

However, when a reading conveying path and a recording conveying path are commonly shared, a reading operation and a recording operation cannot be performed at the same time. In case an attempt is made to perform a sending in the midst of facsimile reception, the facsimile reception is completed, then the recording of the received facsimile is performed, and after the recording is completed, the sending is performed.

That is, in the facsimile machine in which the reading conveying path and the recording conveying path are commonly shared, in case the sending of a facsimile is intended in the midst of facsimile reception, it takes a time until the sending is executed, and there is a problem that inconveniencies are experienced when the facsimile is desired to be urgently sent.

DISCLOSURE OF THE INVENTION

An object of the present invention is to provide a facsimile machine, a control method, a program, and a recording medium of the facsimile machine, which facsimile machine can rapidly send a facsimile when the sending of a facsimile is intended in the midst of facsimile reception in the facsimile machine in which the reading conveying path and the recording conveying path are commonly shared.

According to the present invention, in the facsimile machine in which the reading conveying path and the recording conveying path are commonly shared, in case the sending of a facsimile is intended in the midst of facsimile reception, there are advantages of being able to rapidly perform the sending of the facsimile.

BRIEF DESCRIPTION OF THE DRAWINGS

FIG. 6 is comprised of FIGS. 6A and 6B, showing flowcharts of a reading operation in the facsimile machine 100; and FIG. 7 is comprised of FIGS. 7A and 7B, showing flowcharts of the operation of a second embodiment of the present invention.

BEST MODE FOR CARRYING OUT THE INVENTION

Best modes for carrying out the invention are the following embodiments.

First Embodiment

Figure 1:
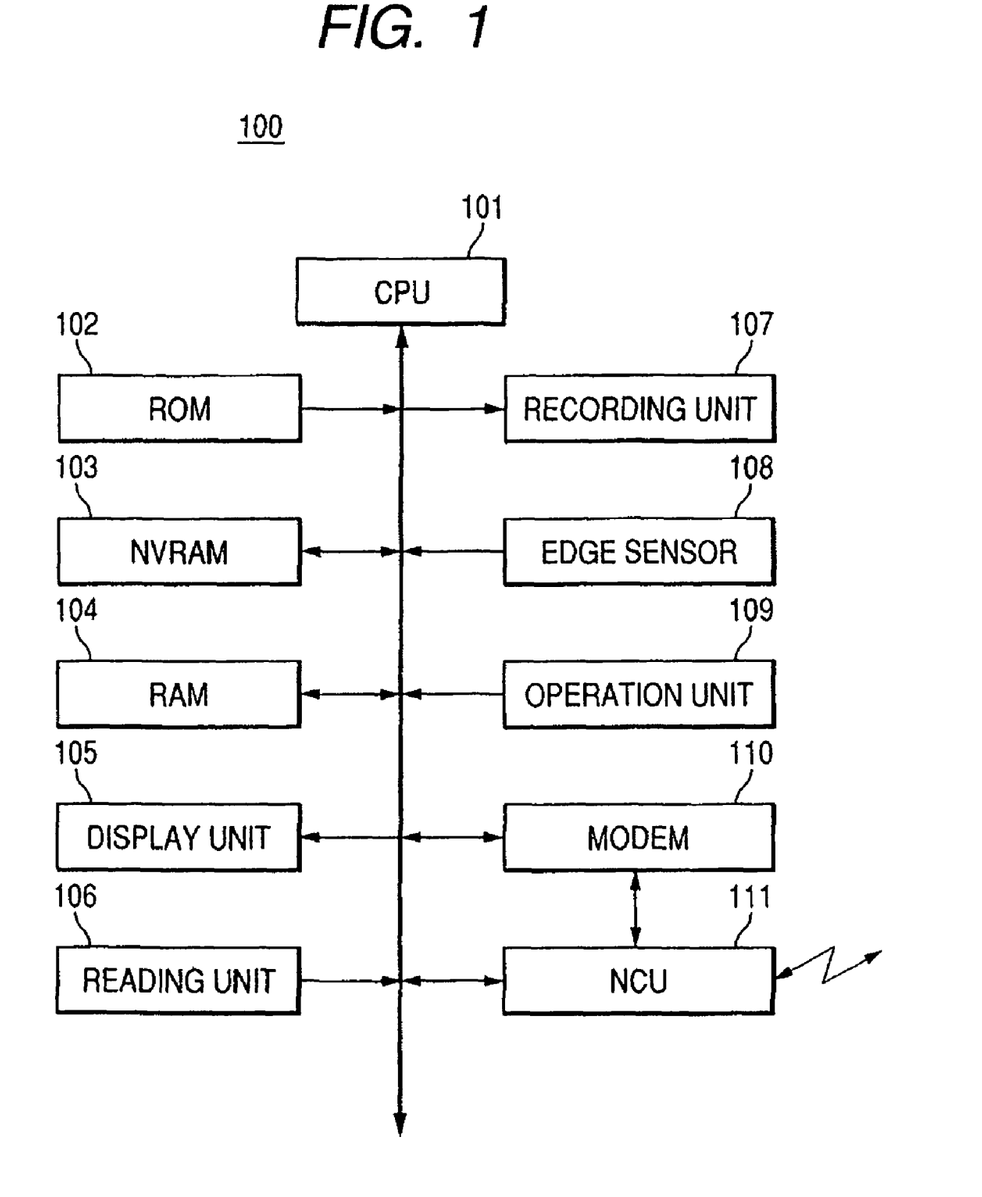
FIG. 1 is a block diagram of a facsimile machine 100, which is a first embodiment of the present invention.

FIG. 1 is a block diagram of a facsimile machine 100 which is a first embodiment of the present invention.

The facsimile machine 100 comprises a CPU 101, a ROM 102, an NVRAM 103, a RAM 104, a display unit 105, a reading unit 106, a recording unit 107, an edge sensor 108, an operation unit 109, a MODEM 110, and an NCU 111.

The CPU 101 controls the facsimile machine 100. The ROM 102 is a memory for storing a control program and the like of the facsimile machine 100. The NVRAM 103 is a non-volatile memory for storing various registered data and operation mode variables.

The RAM 104 is a memory, which stores image data and is used as a work memory necessary for the operation. The display unit 105 displays a state and the like of the facsimile machine 100. A reading unit 106 reads an original when sending and copying are performed. The recording unit 107 records a received image and an image read when copying is performed.

The edge sensor 108 detects that a medium being an original or a recording sheet exists within an original/recording sheet conveying mechanism. The operation unit 109 consists of a plurality of keys, and issues an instruction regarding various operations. The MODEM 110 encodes and decodes an image read and an image received by the reading unit 106, respectively. The NCU 111 performs a network control for communication and sending-out of pulse signal.

FIGS. 2, 3, 4 and 5 show a view of the mechanism of the facsimile machine 100.

The reading unit 106 consists of a CS (contact sensor) 22, a CS holder 26, and a reference white 25.

Figure 2:
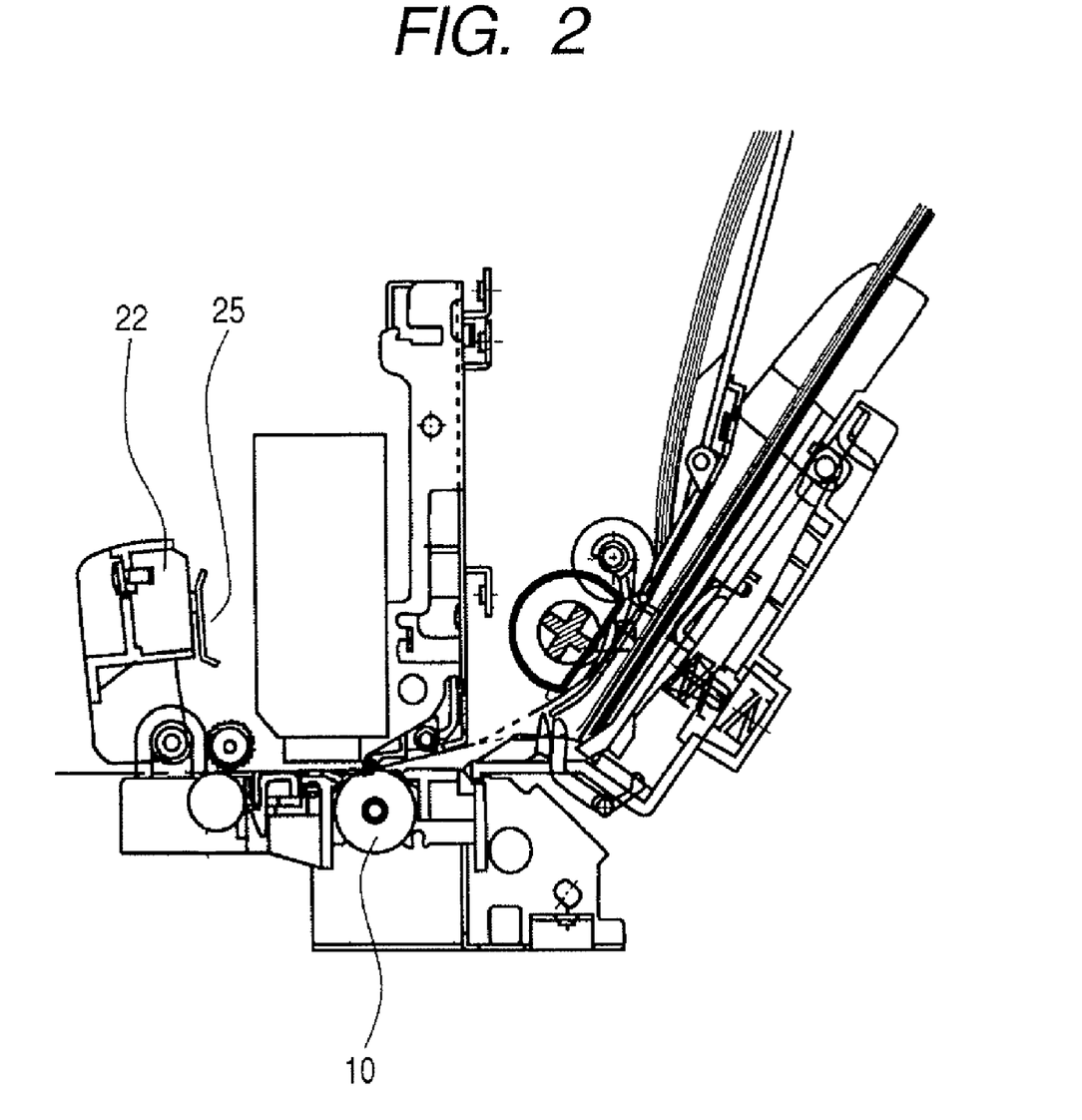
FIG. 2 is a view showing a mechanism of the facsimile machine 100.
Figure 3:
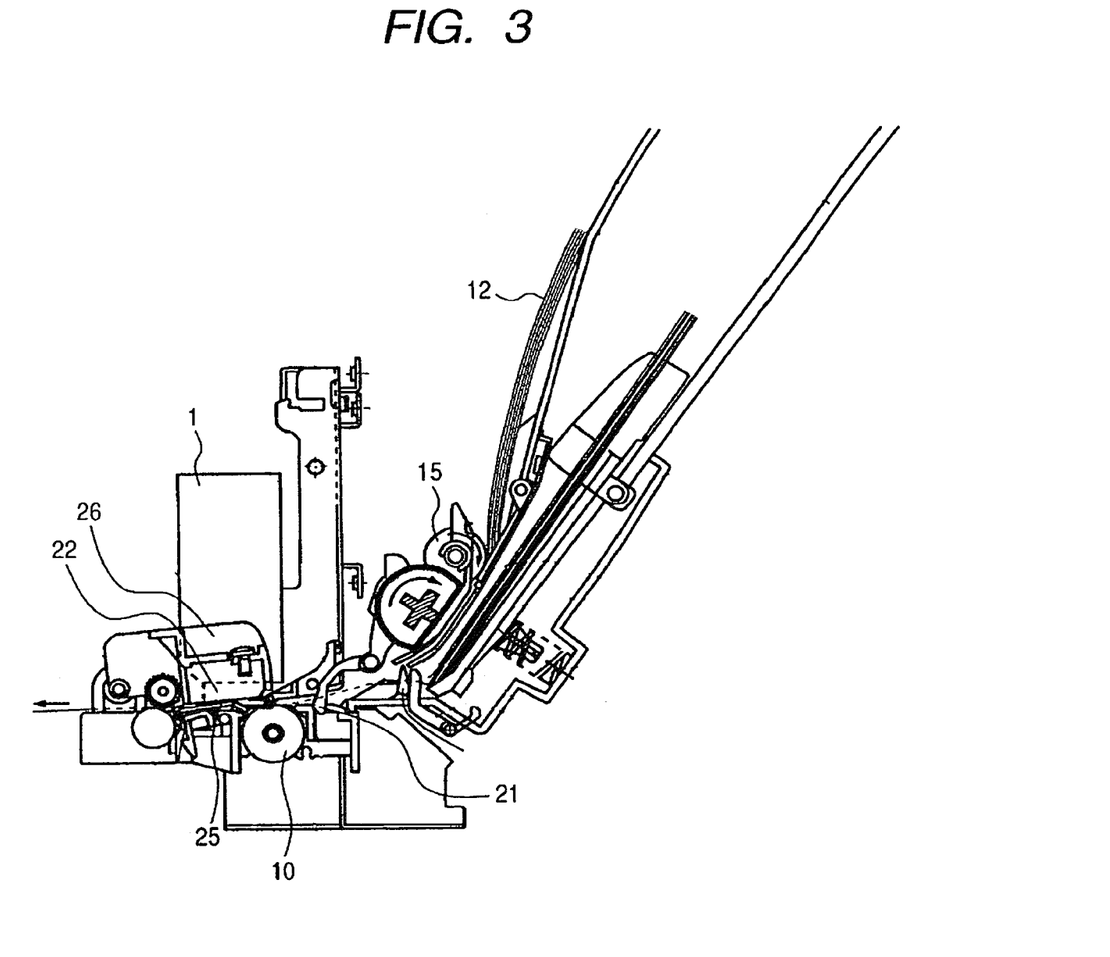
FIG. 3 is a view showing a mechanism of the facsimile machine 100.
Figure 4:
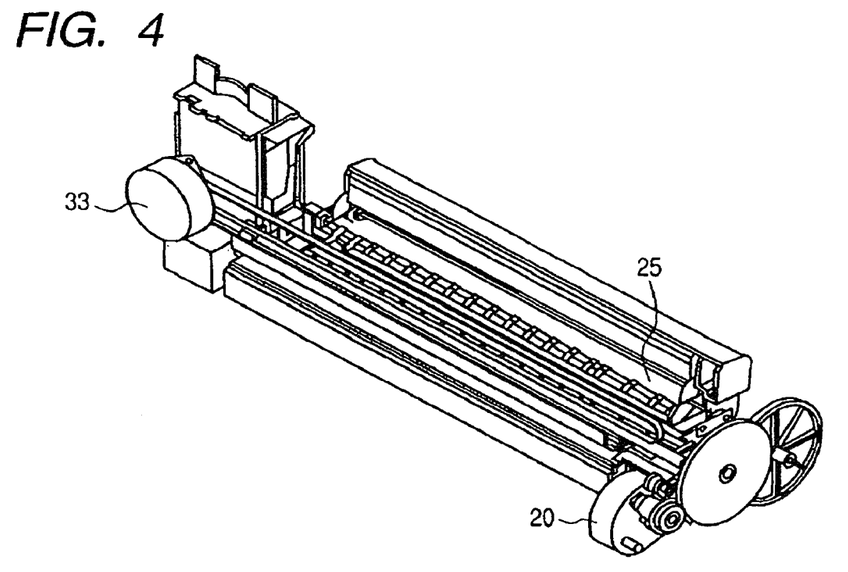
FIG. 4 is a view showing a mechanism of the facsimile machine 100.
Figure 5:
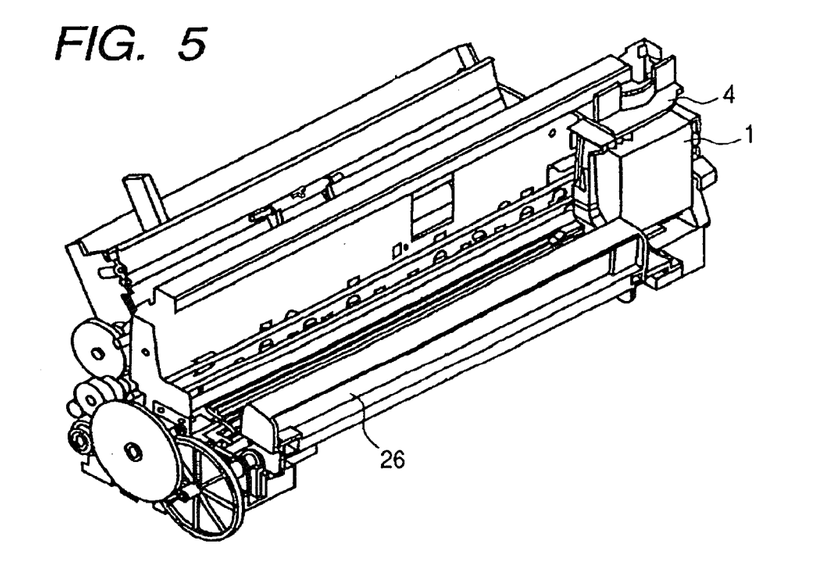
FIG. 5 is a view showing a mechanism of the facsimile machine 100.

The CS 22 is usually located at a position shown in FIG. 2, and moves to a position shown in FIG. 3 only when reading. An original separating roller 15 has its one end coupled with a driving motor 20 through reading driving transfer means and driving switching means.

An ink cartridge 1 is mounted on a carriage 4 so as to perform an ink-jet recording. An actuator 21, a driving motor 20, and a conveying roller 10 connected to the edge sensor 108 are commonly shared at the reading operation time and the recording operation time.

Next, the reading operation in the facsimile machine 100 will be described.

Figures 6, 6A:
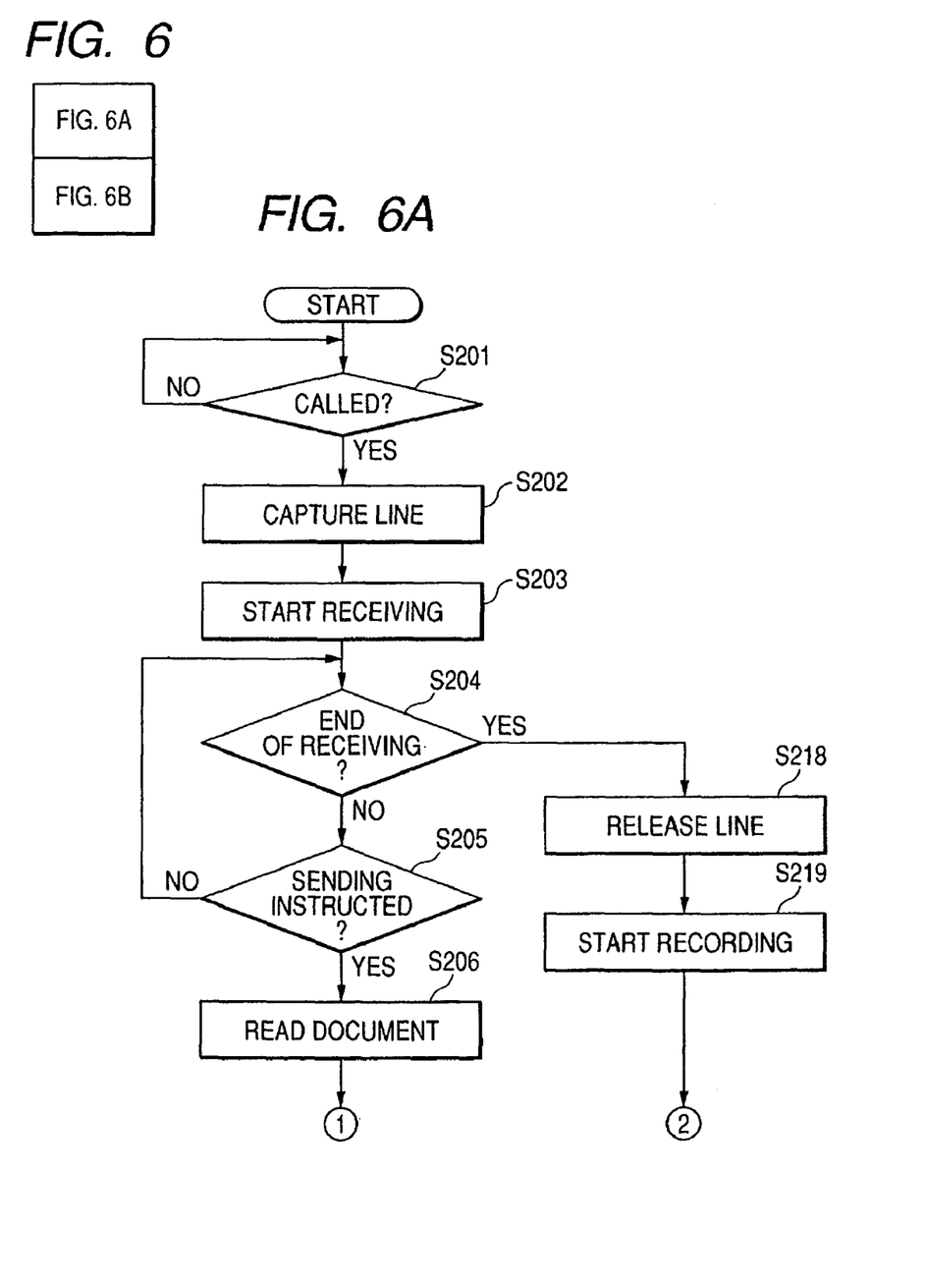
Figure 6B:
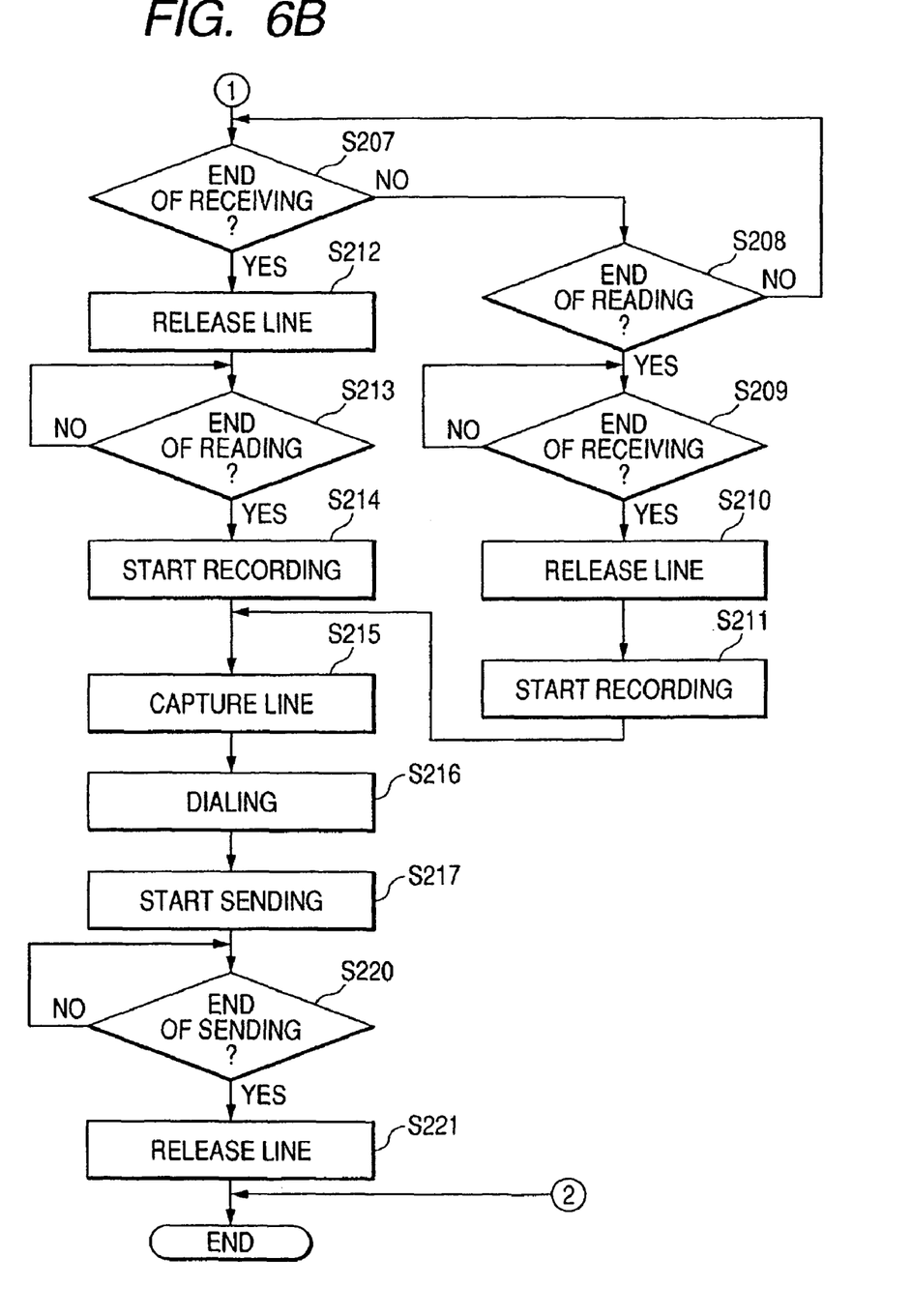

FIGS. 6A and 6B are flowcharts showing the reading operation in the facsimile machine 100.

When facsimile communication to the facsimile machine 100 from a transmitter (not shown) is executed, a call signal arrives from a communication line. When this call signal is detected by the NCU 111, the NCU 111 is controlled, and the communication line is captured, and the MODEM 110 starts receiving (S201, S202, and S203). The received image data is stored in order in the RAM 104.

When the reception is completed, the NCU 111 is controlled, and the communication line is opened, and the received image is recorded in the recording unit 107 (S204, S218, S219).

Now, while in the midst of reception, when a sending instruction (or transmission instruction) is newly issued from the operation unit 109 (S205), the reading unit 106 reads the original (S206). The carriage motor 33 is driven and the carriage 4 is moved to the left, so that the driving switching means switches the driving of the driving motor 20 to a reading mode, and returns the carriage 4 to a home position (position shown in FIG. 5).

The driving motor 20 rotates the original separating roller 15 through the reading driving transfer means, and starts an original feeding operation and, at the same time, operates the CS driving means through the CS driving transfer means so as to start moving the CS holder 26.

By adjusting a gear ratio between the reading driving transfer means and the CS driving transfer means and a roller diameter, the CS holder 26 is designed in such a way as to reach a position shown in FIG. 3 before an original 12 reaches a feeding roller 10.

When the CS holder 26 reaches a position shown in FIG. 3, a clutch that connects the CS driving means and the CS driving transfer means comes off, and the CS holder 26 stops.

When the driving motor 20 is still driven, and the original passes through the feeding roller 10, and reaches a position of the CS 22, the reading is started. The read image data is stored in the RAM 104. At this time, since the reception is not yet completed, the storing into the RAM 104 of the received data, the reading operation of the original, and the storing of the read image data into the RAM 104 are performed in parallel.

The operation advances to step S207, and waits until the facsimile reception is completed or the reading of the original is completed (S207 and S208).

When the facsimile reception is completed earlier, the operation advances to step S212, and the NCU 111 is controlled to open the communication line (S212), and the operation waits until the reading of the original is completed (S213). When the reading is completed, the driving motor 20 is driven in reverse, so that the reading mode by the driving switching means is released and the CS holder 26 is returned to a position shown in FIG. 2. Then, a medium conveying path is opened for conveying a recording sheet, whereby recording of the received image is started (S214).

On the contrary, when the reading of the original is completed earlier, the driving motor 20 is driven in reverse, so that the reading mode by the driving switching means is released, and the CS holder 26 is returned to a position shown in FIG. 2. Then the operation advances to step S209, and waits until the facsimile reception is completed. When the facsimile reception is completed, NCU 111 is controlled to open the communication line, and recording of the received image (S210 and S211) is started.

Next, to perform the sending of the original as read, the NCU 111 is controlled to capture the communication line, and dialing is executed (S215 and S216). When the other party machine responds, the image data of the original as read and then stored in the RAM 104 is read out, and the MODEM 110 starts sending (S217). At this time, the recording operation of the received image data and the sending operation of the image data of the original as read are performed in parallel.

When the sending is completed, the NCU 111 is controlled, and the communication line is opened (S220 and S221).

In the above described embodiment, though the read image data is stored in the RAM 104, it may be stored in the NVRAM 103.

Second Embodiment

While the first embodiment is an example where the recording is started after the reception is completed, a second embodiment is an example where the reception is started at the same time the recording is started.

Figures 7, 7A:
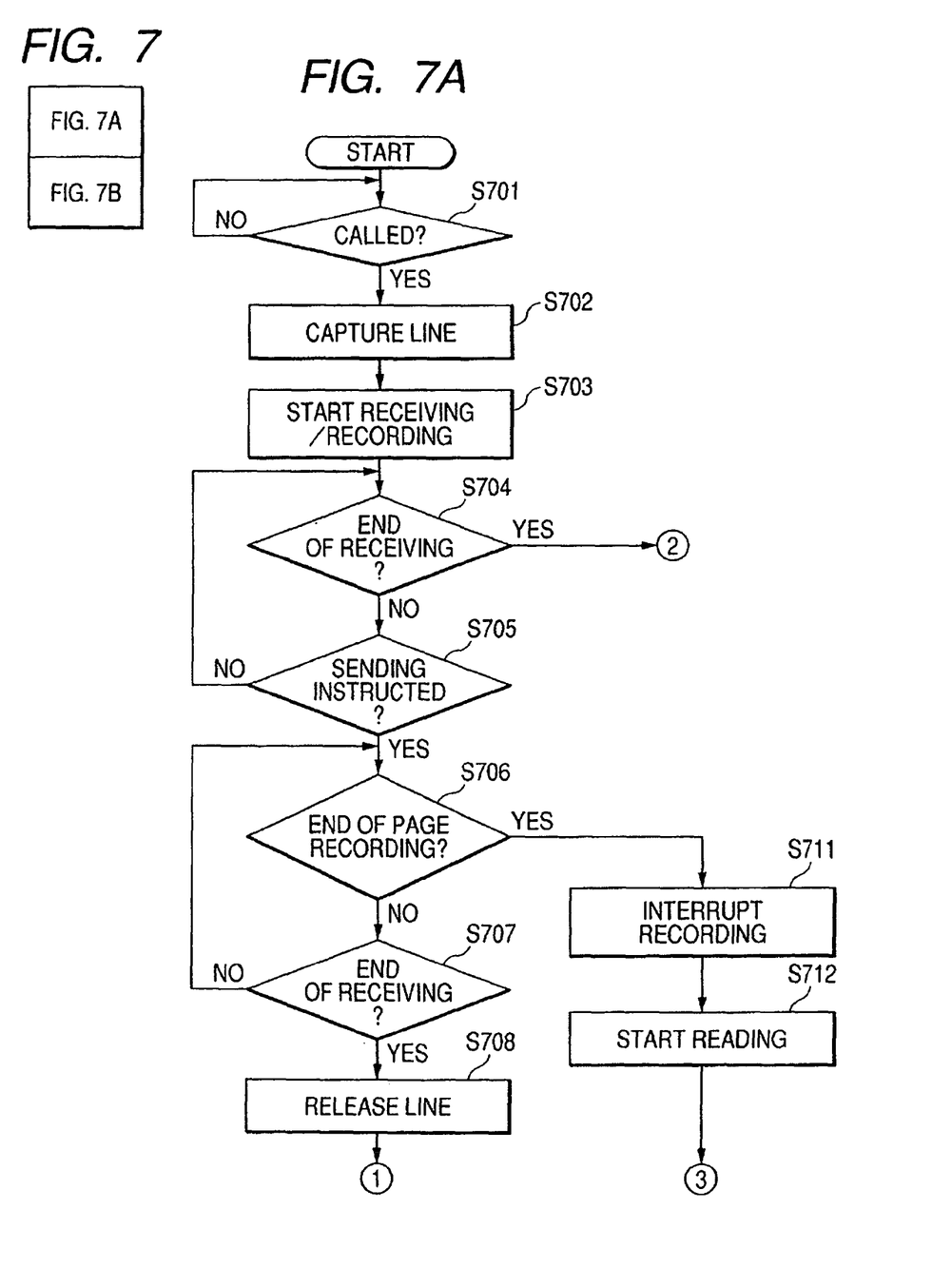
Figure 7B:
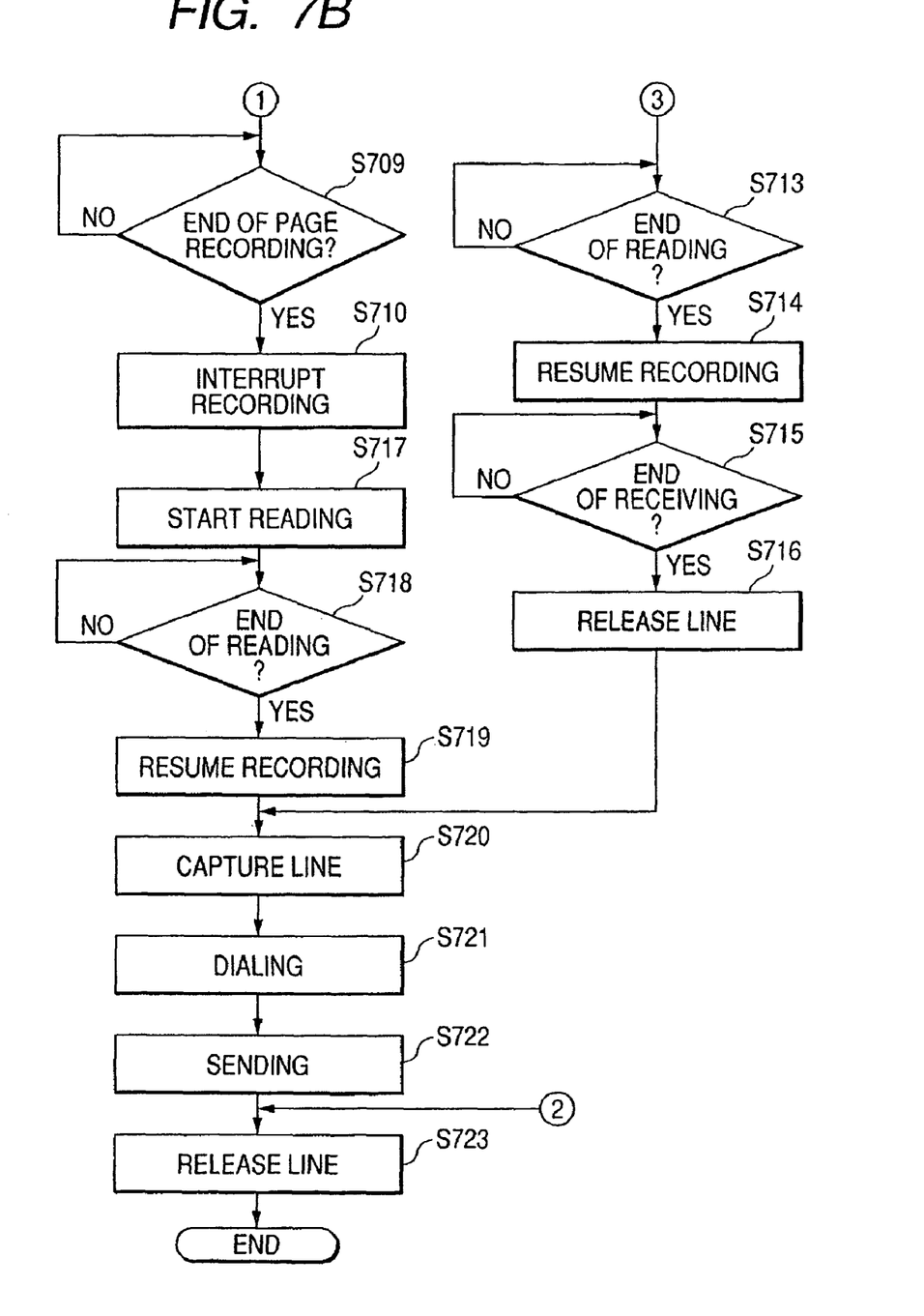

FIGS. 7A and 7B are flowcharts showing an operation of the second embodiment of the present invention.

When facsimile communication to a facsimile machine 100 from a transmitter (not shown) is executed, a call signal arrives from a communication line. When this call signal is detected by an NCU 111, the NCU 111 is controlled, and the communication line is captured, and a MODEM 110 starts receiving and, as the same time, the machine starts recording also (S701, S702, and S703). The received image data is stored in order in a RAM 104.

When the reception is completed, the NCU 111 is controlled, and the communication line is opened (S704 and S723).

When an operation unit 109 newly issues a sending instruction in the midst of receiving a facsimile (S705), a recording operation is temporarily stopped after recording of page(s) being currently recorded is completed (S706 and S711). A carriage motor 33 is driven, and a carriage 4 is moved to the left, so that driving switching means switches the driving of a driving motor 20 to a reading mode, and returns the carriage 4 to a home position (position of FIG. 5). By so doing, a medium conveying path is opened for an original conveyance, and the reading of the original is started (S712).

The driving motor 20 rotates an original separating roller 15 through reading driving transfer means, and starts an original feeding operation and, at the same time, operates CS driving means through CS driving transfer means so as to start moving a CS holder 26. By adjusting a gear ratio between the reading driving transfer means and the CS driving transfer means and a roller diameter, the CS holder 26 reaches a position shown in FIG. 3 before an original 12 reaches a feeding roller 10. When the CS holder 26 reaches the position shown in FIG. 3, a clutch that connects the CS driving means and the CS driving transfer means comes off, and the CS holder 26 stops.

When the driving motor 20 is still driven, and the original passes through a feeding roller 10, and reaches a position of a CS 22, the reading is started. The read image data is stored in the RAM 104. At this time, the recording operation is temporarily stopped, but the receiving operation is continued by storing the received image data in the RAM 104, and is preferably performed in parallel with the storing of the read image data into the RAM 104. In the meantime, while the recording operation is restarted at S714, it is preferable that the reading operation is fully completed at S713 and a medium conveying path is opened for conveying a recording sheet so as to restart the recording operation.

When the reading of the original is completed, the driving motor 20 is driven in reverse, so that the driving switching means releases the reading mode and the CS holder 26 is returned to a position shown in FIG. 2. After that, the suspended recording is restarted (S713 and S714).

When the facsimile reception is completed, the NCU 111 is controlled, and the communication line is opened (S715 and S716).

At step S706, when the facsimile reception is completed earlier than the completion of the recording of the page being currently recorded, the NCU 111 is controlled, and the communication line is opened (S707 and S708). Then, upon completion of the recording of the page being recorded (S709), the recording is interrupted, and the reading of the original is started (S710 and S717).

Upon completion of the reading of the original, the interrupted recording is restarted (S718 and S719).

Next, to perform the sending of the original as read, the NCU 111 is controlled to capture the communication line, and dialing is executed (S720 and S721). When the other party machine responds, the image data of the original as read and then stored in the RAM 104 is read out, and the MODEM 110 starts the sending (S722). At this time, the recording restarting operation and the sending operation of the image data of the original as read are performed in parallel.

When the sending is completed, the NCU 111 is controlled, and the communication line is opened (S723).

While, in the above described embodiment, the read image data is stored in the RAM 104, it may be stored in the NVRAM 103.

According to the above described embodiment, the edge sensor, the driving motor, and the conveying roller are commonly shared for reading and recording, and the facsimile machine can be made compact and reduced in cost. Moreover, in case an attempt is made to perform the sending while the facsimile is in the midst of being received, when the recording of page(s) being recorded is completed, the sending operation is immediately performed even when the recording is not yet made till the last page, and therefore, when an urgent sending of a facsimile is required, it does not have to wait till the recording is completed.

That is, the above described embodiment is an example of the facsimile machine, comprising: reading means for reading the original, communication means for transmitting/receiving image data, first accumulating means for accumulating the received image data in a memory, recording means for reading and recording the image data following reading-out of the same from the memory, transmission instruction means for instructing the transmission of the original, a medium conveying mechanism being conveying mechanism common for the original and the recording sheet, and control means for controlling in such a way that the reading means performs the reading operation of the original to be transmitted based on the instruction of the transmission instruction means precedently than performance of a recording operation of the received image data by the recording means in case the instruction means issues an instruction for transmission the original when the communication means receives the image data and the first accumulating means performs a memory accumulating operation of the received image data.

Further, the above described embodiment can be grasped as an invention of a program. That is, the above described embodiment is an example of the program, in a facsimile machine comprising a medium conveying mechanism being a conveying mechanism common for an original and a recording sheet, allowing a computer to execute: a reading procedure for reading the original by reading means; a communication procedure for transmitting/receiving image data; first accumulating procedure for accumulating the received image data in a memory; a recording procedure for reading the image data accumulated in the memory and recording the same by recording means; a transmitting instruction procedure for instructing the transmission of the original; and a control procedure for controlling in such a way that the reading of the original to be transmitted by the reading procedure based on the instruction by the transmitting instruction procedure takes precedence over the recording of the received image data performed by the recording procedure in case the transmission of the original is instructed by the transmission instruction procedure when the image data is received by the communication procedure and a memory accumulating operation of the received image data by the first accumulating procedure is performed.

Further, the above described program may be stored in FD, CD, DVD, HD, a semiconductor memory or the like.

This application claims priority from Japanese Patent Application No. 2003-407977 filed on Dec. 5, 2003, which is hereby incorporated by reference herein.

The invention claimed is:

1. An image communication apparatus comprising:
    first communication means for receiving first image data;
    first accumulating means for accumulating in a memory the first image data received by said first communication means;
    recording means for recording on a recording sheet the first image data accumulated by said first accumulating means in the memory;
    reading means for reading an original sheet and obtaining second image data;
    second communication means for transmitting the second image data obtained by said reading means;
    transmitting instruction means for instructing reading of the original sheet and transmission of the second image data by said second communication means;
    a medium conveying mechanism used in common to convey the original sheet read by said reading means and for conveying the recording sheet on which the first image data is recorded by said recording means, wherein said medium conveying mechanism includes an openable medium conveying path; and
    control means for controlling said image communication apparatus in such a way that in a case where said transmitting instruction means instructs the reading of the original sheet and transmitting of the second image data while said first communication means receives the first image data and said first accumulating means accumulates the first image data,
    wherein said reading means reads the original sheet and obtains the second image data while said first communication means receives the first image data, and before said recording means records the first image data on the recording sheet,
    wherein said recording means records the first image data on the recording sheet while said second communication means transmits the second image data,
    wherein said control means controls said medium conveying mechanism to automatically switch from conveying the original sheet to conveying the recording sheet after said reading means completes the reading of the original sheet and said first communication means completes the reception of the first image data, and
    wherein said control means controls said medium conveying mechanism to automatically switch from conveying the original sheet to conveying the recording sheet by opening the medium conveying path for the recording sheet.

2. The image communication apparatus according to claim 1, further comprising moving means for moving said reading means to a reading position when said reading means reads the original sheet, and for moving said reading means to a retracted position when the reading of the original sheet is completed.

3. The image communication apparatus according to claim 1, wherein said control means controls in such a way that the memory accumulating operation of the first image data by said first accumulating means and the reading of the original sheet and obtaining of the second image data to be transmitted are performed in parallel.

4. The image communication apparatus according to claim 1, wherein the medium conveying mechanism is constructed such that the use of the medium conveying mechanism in reading the original sheet is exclusive of the use of the medium conveying mechanism in recording the first image data on the recording sheet.

5. The image communication apparatus according to claim 1, further comprising second accumulating means for accumulating the image read by said reading means in the memory, wherein said control means controls in such a way that said second accumulating means performs a memory accumulating operation of the second image data before said recording means performs recording of the first image data in a case in which said transmitting instruction means issues an instruction for transmitting the second image data when said first communication means receives the first image data and the first accumulating means performs the memory accumulating of the first image data.

6. The image communication apparatus according to claim 5, wherein said control means controls in such a way that the memory accumulating operation of the first image data by said first accumulating means and the memory accumulating operation of the second image data by said second accumulating means are performed in parallel.

7. The image communication apparatus according to claim 5, wherein, after completion of the memory accumulating operation of the first image data by said first accumulating means, the transmitting of the second image data by said second communication means is started, and after completion of the reading of the original sheet and obtaining of the second image data by said reading means, said recording means operates to record the first image data, and said control means controls in such a way that the transmitting of the second image data and the recording of the first image data are performed in parallel.

8. The image communication apparatus according to claim 5, wherein, when said transmitting instruction means issues an instruction for transmitting the second image data while a plurality of pages are being recorded, recording of the plurality of pages is temporarily interrupted before completion of recording, and after the completion of the reading of the original sheet by said reading means instructed by said transmitting instruction means and accumulation thereof into said memory by said second accumulating means, recording of the plurality of pages is resumed.

9. A control method of an image communication apparatus provided with a medium conveying mechanism used in common to convey an original sheet read by a reading means and for conveying a recording sheet on which first image data is recorded by a recording means, wherein the medium conveying mechanism includes an openable medium conveying path, the control method comprising:

a first communication step for receiving the first image data;

a first accumulating step for accumulating the first image data in a memory;

a recording step for reading the first image data accumulated in the memory and recording the first image data by the recording means;

a reading step for reading the original sheet and obtaining second image data by the reading means;

a second communication step for transmitting the second image data obtained in said reading step;

a transmitting instruction step for instructing reading of the original sheet and transmitting of the second image data; and a controlling step for controlling in such a way that in a case where performance of said transmitting instruction step instructs the reading of the original sheet and transmitting of the second image data while the first image data is received in said first communication step and accumulated in said first accumulating step, wherein said reading step is performed to read the original sheet and obtain the second image data while the first image data is received in said first communication step, and before the first image data is recorded on the recording sheet in said recording step, wherein said reading step is performed to record the first image data on the recording sheet while the second image data is transmitted in said second communication step, wherein said controlling step controls the medium conveying mechanism to automatically switch from conveying the original sheet to conveying the recording sheet after completion of the reading of the original sheet in said reading step and completion of the reception of the first image data in said first communication step, and wherein said controlling step controls the medium conveying mechanism to automatically switch from conveying the original sheet to conveying the recording sheet by opening the medium conveying path for the recording sheet.

10. A computer-readable memory medium storing a program and readable by a computer in an image communication apparatus provided with a medium conveying mechanism used in common to convey an original sheet read by a reading means and for conveying a recording sheet on which first image data is recorded by a recording means, wherein the medium conveying mechanism includes an openable medium conveying path, the program allowing the computer to execute:

a first communication procedure for receiving the first image data;

a first accumulating procedure for accumulating the first image data in a memory;

a recording procedure for reading the first image data accumulated in the memory and recording the first image data by the recording means;

a reading procedure for reading the original sheet and obtaining second image data by the reading means;

a second communication procedure for transmitting the second image data obtained in said reading procedure;

a transmitting instruction procedure for instructing reading of the original sheet and transmitting of the second image data; and a controlling procedure for controlling in such a way that in a case where performance of said transmitting instruction procedure instructs the reading of the original sheet and transmitting of the second image data while the first image data is received in said first communication procedure and accumulated in said first accumulating procedure, wherein said reading procedure is performed to read the original sheet and obtain the second image data while the first image data is received in said first communication procedure, and before the first image data is recorded on the recording sheet in said recording procedure, wherein said recording procedure is performed to record the first image data on the recording sheet while the second image data is transmitted in said second communication procedure, wherein said controlling procedure controls the medium conveying mechanism to automatically switch from conveying the original sheet to conveying the recording sheet after completion of the reading of the original sheet in said reading procedure and completion of the reception of the first image data in said first communication procedure, and wherein said controlling procedure controls the medium conveying mechanism to automatically switch from conveying the original sheet to conveying the recording sheet by opening the medium conveying path for the recording sheet.

* * * * *